Patented May 22, 1928.

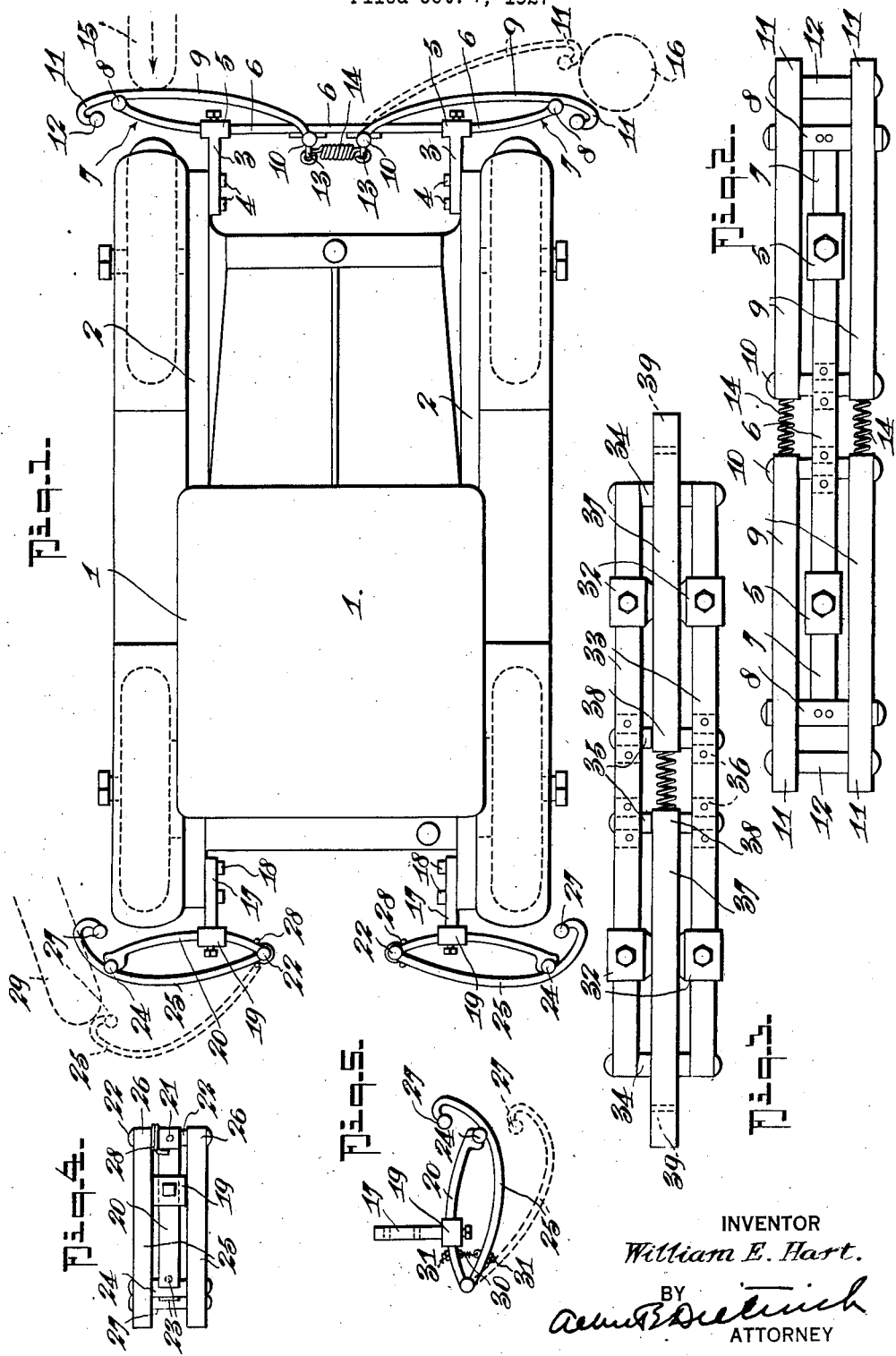

1,670,963

UNITED STATES PATENT OFFICE.

WILLIAM E. HART, OF SAN JOSE, CALIFORNIA.

AUTOMOBILE BUMPER.

Application filed October 7, 1927. Serial No. 224,662.

My invention relates to the art of bumpers and particularly to those designed for and adapted to be used on the front and rear of automobiles to protect the vehicle against damage in collision. Some are of a rigid or non-yielding type, others are of the so-called elastic or yieldable type, but all those of both types with which I am familiar have no provision to prevent interlocking of their ends with objects engaged, and consequently the bumpers frequently become bent at their extremities, or by interlocking with an object become broken off. If the object be the weaker structure, the object is bent, broken off or otherwise damaged.

Therefore the invention has for its object to provide a bumper which will effectually serve its intended purpose as a protection to the car when moved forward (relatively) but, which, if it is engaged with an object when the vehicle is moving rearwardly (relatively) will yield and pass the object engaged without damaging the bumper or the object engaged.

Further it is an object to provide a bumper that will not be torn away from its mountings when hit on its own side (i. e. side adjacent the automobile), and yet will function to protect the vehicle in case of collision or contact with some object on its outer side (i. e. side away from the automobile).

Further it is an object to provide bumpers which extend far enough sidewise to protect fenders, hub caps and the front wheels in turning.

Other objects will in part be obvious and in part be pointed out herinafter.

To the attainment of the aforesaid objects and ends, my invention consists in the novel details of construction, combination and arrangement of parts, all of which will be first fully described in the following detailed description, then be particularly pointed out in the appended claims, reference being had to the accompanying drawings, in which:—

Figure 1 is a plan view of an automobile with one embodiment of my invention applied to the front and another to the rear.

Figure 2 is a front elevation of the front bumper shown in Figure 1.

Figure 3 is a front elevation of a modified form of the type of bumper shown in Figure 1, Figure 4 is a face view of one of the rear bumpers shown in Figure 1.

Figure 5 is a plan view illustrating a further modified embodiment of the invention, being of the rear type shown in Figure 1.

In the drawings in which like numerals of reference indicate like parts in all of the figures, 1 generally designates an automobile and 2 the chassis thereof. In Figure 1 of the drawings I have illustrated two forms of the invention, one attached to the front end and another to the rear end.

In the form of the invention illustrated at the front of the automobile in Figure 1 mounting brackets 3 are secured as at 4 to project forwardly from the advance ends of the automobile chassis, and in the mounting heads 5 of the said brackets a main bumper bar 6 is secured through the medium of set screws or other suitable securing means.

The bar 6 may be constructed of flat resilient metal and as the ends thereof are extended laterally beyond the mounting heads 5, bent slightly forwardly as at 7, and equipped at their extremities with abutment heads 8.

The abutment heads or rods 8 are long enough, or in other words, project above and below the bar end 7 to engage both of the pair of the upper and lower yieldable bumper members 9 provided at each bumper end. The pairs of bars 9 each constituting a yieldable abutment member are pivoted at their inner ends as at 10 to the main bumper bar 6 and have their outer ends extended beyond the abutment heads 8 and partially coiled as at 11 to avoid presenting sharp edges or corners for engagement with obstructions. The partially coiled ends 11 are connected by a suitable connector piece 12.

At their inner hinged ends each yieldable bumper member 9 is equipped with a crank lug 13, and a coiled spring 14 is connected across between the said lugs and serves to hold the said yieldable members to their normal positions illustrated in full lines in Figure 1, or against the abutment heads 8.

By constructing and mounting a bumper as illustrated at the advance end of the automobile shown in Figure 1, the said bumper will serve to yieldably absorb shocks of collision directed toward the front of the vehicle, as for example by the tire of an oncoming vehicle as indicated at 15 in the said figure.

Should the extended ends of the bumper be engaged from the inside, however, either by an automobile pasing the vehicle upon which the bumper is mounted and heading in the same direction, or by reason of the said vehicle backing into a parking space and striking an obstruction of any kind generally indicated at 16 in the said figure, the yieldable members 9 of the said bumper are free to hinge forwardly as indicated by the dotted lines in the said figure, and when the obstruction is passed they will be drawn back to their normal position by the springs 14.

At the rear of the automobile shown in Figure 1, I have illustrated yieldable bumpers of the separated or unit type adapted to be mounted one at each side of the vehicle to provide a space for mounting a spare tire. In this form of the invention mounting brackets 17 are secured as at 18 to the rear ends of the chassis and in the mounting heads 19 of the said brackets curved bumper bars 20 are secured in any approved manner.

The bumper bars 20 each has secured, as at 21, at its inner end, a pivot rod 22 and at its other or outer end has secured thereto, as at 23, an upright abutment head 24. A yieldable pair of upper and lower bumper members 25 are curled around and pivoted at their inner ends as at 26 to the rod 22 and are partially coiled at their outer or extended ends and joined by a connector piece 27.

A coiled spring 28 is coiled about each rod 22 and engages the bumper members 20 and 25 in such a manner as to always hold the said members 25 in their normal positions illustrated in full lines in Figure 1, or against the abutment heads 24. In use the rear bumpers just described present a resilient shock absorbing surface to obstructions such as are encountered by an automobile in backing, or provided by a vehicle driven head-on into the rear end of the automobile upon which the bumpers are mounted. However, when the extended ends of the members 25 are engaged by obstructions such as the tire indicated at 29 in the said figure, the members 25 are free to move on their hinge connection against the tension of the coiled spring and when released will be forced back by the said spring to the normal position against the abutment 24.

In Figure 5 of the drawings I have illustrated a rear bumper unit similar to those shown in Figure 1 in every detail except that instead of providing the coiled spring 28 a retractile spring 30 may be secured as at 31 to and between the bumper members 20 and 25 to serve the same purpose as the said coiled spring.

In Figure 3 of the drawings I have illustrated a front bumper similar to that shown at the front of the automobile in Figure 1 except that where the bumper shown in the said Figure 1, and a face view of which is shown in Figure 2, comprises a single main bar 6 and pairs of yieldable bars 9, the said bumper shown in Figure 3 is constructed to comprise a pair of upper and lower main bumper bars and single yieldable members extended at their ends beyond the main bars. In the illustration in Figure 3 the bracket mounting heads 32 are made double to carry the upper and lower main bumper bars 33 which are connected at their ends by connecting and abutment heads 34 but equipped intermediately of their ends with pivot rods 35 secured thereto at 36.

The single yieldable bumper members 37 are pivoted or hinged at their inner ends as at 38 upon the rods 35 and have their other ends extended and partially coiled as at 39 to provide the extended yieldable bumper portions. Springs 40 serve to hold the parts in the normal position and correspond in purpose and function to the springs 14 shown in Figure 1. As the functioning of this bumper is substantially the same as the one shown in Figures 1 and 2 description of the operation thereof is deemed unnecessary.

The single bumper members 37 are equipped with crank lugs similar to those 13 of the double members and which are connected by a spring 40 to hold the said members 37 to their normal positions.

In the foregoing description I have disclosed a number of forms of bumpers all provided with yieldable projected portions which are relatively rigid against obstructions toward the vehicle upon which they are mounted but which are free to yield and pass obstructions from other directions without breakage or damage. In this manner it is possible to extend the bumpers laterally of the machine far enough to assure full protection of the machine even when the wheels are in the turning position.

While I have shown and described numerous forms of bumpers embodying my invention, yet I do not desire to limit myself to any specific form or construction beyond the scope of the appended claims.

From the foregoing description, taken in connection with the accompanying drawings, it is thought that the novel details of construction, the manner of use and the advantages of my invention will be readily apparent to those skilled in the art to which it relates.

What I claim is:

1. In bumpers, mounting brackets, a main bumper bar carried by the brackets and having laterally and forwardly extended ends, abutment members carried by said ends, yieldable bumper members pivoted at their inner ends to the main bumper bar and having their other ends extended laterally beyond the said main bar ends, and spring connections to normally hold the extended ends against the abutment members while permitting yielding movement of said extended ends away from the abutment members when engaged in a certain direction.

2. In bumpers, mounting brackets, a main bumper bar carried by the brackets and having laterally and forwardly extended ends, abutment members carried by said ends, yieldable bumper members pivoted at their inner ends to the main bumper bar and having their other ends extended laterally beyond the said main bar ends, said yieldable bumper members each being bowed toward the main bumper bar and positioned to bring one of the brackets within the limits of the bow thereof, and said yieldable bumper extended ends being slidable over said abutment members, and spring connections to normally hold the yieldable bumper extended ends against the abutment members while permitting yielding movement of said ends against the abutment members when engaged in a certain direction.

3. In bumpers, mounting brackets, a main bumper bar carried by the brackets and having laterally and forwardly extended ends, abutment members carried by said ends, yieldable bumper members pivoted at their inner ends to the main bumper bar and having their other ends extended laterally beyond the said main bar ends, said yieldable bumper members each being bowed toward the main bumper bar and positioned to bring one of the brackets within the limits of the bow thereof, and said yieldable bumper extended ends being slidable over said abutment members, each said bumper member at the pivoted end having a crank lug extending rearwardly therefrom, and a spring connecting the lug extensions to normally hold the yieldable bumper extended ends against the abutment members while permitting yielding movement of said ends against the abutment members when engaged in a certain direction.

4. In bumpers, a main bumper bar, a yieldable bumper bar pivoted at one end to the main bumper bar and extending beyond the main bumper bar at its other end, yieldable means to normally hold the non-pivoted ends of the bumper bars in engagement, at least one of said bars being bowed toward the other said bar, and a mounting bracket secured to the main bumper bar intermediately of the bow.

5. In bumpers, a main bumper bar, a yieldable bumper bar pivoted at one end to the main bumper bar and extending beyond the main bumper bar at its other end, yieldable means to normally hold the non-pivoted ends of the bumper bars in engagement, at least one of said bars being bowed toward the other said bar, a mounting bracket secured to the main bumper bar intermediately of the bow, and an abutment member carried by the main bumper bar and adapted to be slidably engaged by the free end of the yieldable bumper bar.

6. In bumpers, reversely bowed bumper members pivoted together at one end, one of said members being longer and extended beyond the non-pivoted end of the other member and in slidable engagement with said non-pivoted end, yieldable means to normally hold the non-pivoted ends of the members in engagement, and a mounting bracket secured to the shorter member intermediately of the bow thereof.

WILLIAM E. HART.